United States Patent [19]

Shimada et al.

[11] Patent Number: 5,512,262
[45] Date of Patent: Apr. 30, 1996

[54] PROCESS FOR CLEANING HARMFUL GAS

[75] Inventors: Takashi Shimada; Toshio Okumura; Toshiya Hatakeyama, all of Hiratsuka, Japan

[73] Assignee: Japan Pionics Co., Ltd., Tokyo, Japan

[21] Appl. No.: 241,758

[22] Filed: May 12, 1994

[30] Foreign Application Priority Data

May 19, 1993 [JP] Japan ..................... 5-139269

[51] Int. Cl.$^6$ .......................... B01D 53/64; B01D 53/72
[52] U.S. Cl. ........................ 423/245.1; 423/210
[58] Field of Search ................... 423/210, 245.1

[56] References Cited

U.S. PATENT DOCUMENTS

| | | | |
|---|---|---|---|
| 4,535,072 | 8/1985 | Kitayama et al. | 502/411 |
| 4,910,001 | 3/1990 | Kitahara et al. | 423/210 |
| 4,976,933 | 12/1990 | Mungall et al. | 423/210 |
| 5,213,767 | 5/1993 | Smith et al. | 423/210 |

FOREIGN PATENT DOCUMENTS

| | | |
|---|---|---|
| 1121339 | 10/1984 | European Pat. Off. . |
| 0261950A2 | 3/1988 | European Pat. Off. . |
| 0280585 | 8/1988 | European Pat. Off. . |
| 0429053A1 | 5/1991 | European Pat. Off. . |
| 0495392A1 | 7/1992 | European Pat. Off. . |
| 2609905 | 7/1988 | France . |

*Primary Examiner*—Michael Lewis
*Assistant Examiner*—Peter T. DiMauro
*Attorney, Agent, or Firm*—Frishauf, Holtz, Goodman, Langer & Chick

[57] ABSTRACT

A process for cleaning a harmful gas which includes contacting a gas containing as a harmful component an alkoxide compound of the formula $M(OR)_x$, wherein M is a metallic element, OR is an alkoxy group and x is the valency of the metal, such as trimethylphosphorous, with a cleaning agent, which is an alkali metal compound such as potassium hydroxide, sodium hydroxide and potassium oxide, supported on a metallic oxide composition comprising cupric oxide and manganese dioxide, wherein the total amount of the cupric oxide and the manganese dioxide is at least 60% by weight based on the total amount of the metallic oxide, to remove the harmful component from the harmful gas. The process effectively and safely removes harmful components in gases exhausted from semiconductor manufacturing processes.

12 Claims, No Drawings

PROCESS FOR CLEANING HARMFUL GAS

BACKGROUND OF THE INVENTION

1. Field of the Invention

The present invention relates to a process for cleaning a harmful gas. More particularly, it pertains to a process for cleaning a harmful gas containing any of various alkoxide compounds and silane compounds that are used in the production step of a liquid crystal or a CVD step in semiconductor manufacturing process.

2. Description of the Related Art

With the continuous development of the semiconductor industry accompanied by a high degree of integration and miniaturization of the related products, there has been a steady rise in recent years in the amounts of alkoxide compounds typified by tetraethoxysilane and silane compounds typified by monosilane. In addition, pentaethoxytantalum which is an alkoxide compound has been brought into use in the CVD step as a raw material for a tantalum oxide film which is employed for a semiconductor device from a new compound or the like, for example, an interlaminar insulating film.

Most of the above-mentioned alkoxide compounds and silane compounds are highly toxic or unknown in toxicity and are combustible.

These alkoxide compounds and silane compounds are indispensable as raw materials or doping gases in the production process for silicon-based semiconductors and liquid crystals. At any rate it is necessary to remove a harmful component in the gas after being used in the semiconductor production process prior to discharge in the atmosphere.

As a process for cleaning a gaseous alkoxide compound, gaseous silane compound or the like contained in a gas, there are available two kinds of processes, one being the wet process in which harmful components are absorbed in an absorbing solution composed principally of an aqueous solution of an acidic component by the use of a scrubber; and the other being a dry process which makes use of activated carbon, a porous adsorbent of inorganic compound type, metallic salt supported on activated carbon, etc. (Japanese Patent Application Laid-Open No.207426/1991.)

However, the above-mentioned wet process suffers the disadvantages that when the equipment used therefor is large-sized, there is difficulty in post-treatment, it requires a considerable expense in the maintenance of the equipment and further that the absorption efficiency is not necessarily high, thereby making it impossible to immediately and completely treat a highly concentrated harmful gas at the present time. In addition the wet process brings about the problem of sludge formation due to the generation of a powdery oxide which is produced by the decomposition of tetraethoxysilane, monosilane or the like.

The dry process exemplified by the above-mentioned adsorptive treatment with activated carbon is disadvantageous in its low removing capability of harmful components and further requires a countermeasure against the possible hazard of causing fire when there are used a combustible or inflammable gas such as monosilane, and at the same time, a combustible gas such as hydrogen or a combustion-supporting gas such as oxygen each as a diluting or carrier gas.

Such being the case, there has long been desired the materilization of a process for cleaning a harmful gas, especially that discharged from the semiconductor industry, said process being enhanced in both treatment rate and treatment capacity for the harmful gas, excellent in removal performance, not only in an emergency when a relatively less concentrated, but a large amount of a harmful gas is leaked from a gas cylinder because of its abnormality, but also in the ordinary case where a harmful gas is discharged in a high concentration after being used in semiconductor production process, and free from the possibility of causing the hazard of fire in the case of gas cleaning or the clogging in a cleaning column due to sludge formation.

SUMMARY OF THE INVENTION

Under such circumstances, intensive research and investigation were concentrated by the present inventors in order to develop a process for efficiently cleaning a harmful gas such as an alkoxide compound and a silane compound by overcoming the above-mentioned problems. As a result it has been found that the use of a cleaning agent comprising an alkali metal compound supported on a metallic oxide which comprises cupric oxide and manganese dioxide as principal components is capable of removing the above-mentioned alkoxide compound and silane compound in high efficiency and with safety. The present invention has been accomplished on the basis of the aforesaid finding.

Specifically, the present invention provides a process for cleaning a harmful gas which comprises bringing a gas containing at least one member selected from the group consisting of an alkoxide compound and a silane compound as a harmful component into contact witch a cleaning agent comprising an alkali metal compound supported on a metallic oxide which comprises cupric oxide and manganese dioxide as principal components to remove the harmful component from the gas.

The process for cleaning a harmful gas according to the present invention is applicable to a harmful gas of an alkoxide compound-basis represented by the chemical formula $M(OR)_x$ wherein M is a metallic element; OR is an alkoxy group; and x is the valency of the metal, which compound is exemplified by $Si(C_2H_5O)_4$, triethoxyarsenic, triethoxyboron, trimethylphosphoric acid, triethylphosphoric acid, trimethylphosphorous acid, triethylphosphorous acid, pentaethoxytantalum and tetraisopropoxytitanium as well as a harmful gas of a silane compound-basis represented by the chemical formula $Si_xH_{2x+2}$ such as monosilane and disilane.

In particular, the process according to the present invention is capable of rapidly cleaning a large amount of harmful gas at ordinary temperature and thus exerts excellent effect on the cleaning of the gas exhausted from a semiconductor manufacturing process and rapid cleaning of the air polluted with a harmful gas due to sudden leakage from a gas cylinder.

There is employed in the present invention, a cleaning agent comprising an alkali metal compound supported on a metallic oxide.

The metallic oxide comprises cupric oxide and manganese dioxide as principal components and may be incorporated with cobalt (III) oxide, silver (I) oxide, silver (II) oxide, aluminum (III) oxide, silicon dioxide or the like. The content of the total sum of cupric oxide and manganese dioxide in the composition comprising said two components as the principal ones is usually 60% or more, preferably 70% or more by weight. The ratio manganese dioxide to cupric oxide ($CuO:MuO_2$) is usually about 1:0.8 to 5, preferably 1:1.2 to 3.0 by weight.

The metallic oxide-based composition comprising the above-mentioned cupric oxide and manganese dioxide as principal components can be prepared by a publicly known method such as mixing of each component but are conveniently available on the market under the trademark HOPKALITE, which is mainly a binary composition comprising 40% by weight of cupric oxide and 60% by weight of manganese dioxide. It sometimes further contains an oxide of potassium, magnesium, aluminum, silicon or the like in an amount of about 30% or less by weight in addition to the aforesaid two components. At any rate, the HOPKALITE composition may be employed as such or in the form of a mixture with at least one metallic oxide as described hereinbefore.

The metallic oxide to be used in the present invention is usually in the form of a molding and may be in the form of a crushed product, an extruded molding, a tableted molding or the like. The preferable size thereof is about 4 to 20 mesh for the crushed product, about 1.5 to 4 mm in diameter by 3 to 20 mm in height for the extruded molding and about 3 to 6 mm in diameter by 3 to 6 mm in height for the tableted molding, which is usually cylindrical.

Examples of the alkali metal compound to be supported on the metallic oxide include a hydroxide, an oxide, a carbonate each of potassium, sodium or lithium, and such compound is specifically exemplified by potassium hydroxide, sodium hydroxide, lithium hydroxide, potassium oxide, sodium oxide, potassium carbonate, sodium carbonate and a mixture of at least two of them. Of these are preferably potassium hydroxide, sodium hydroxide, potassium oxide and potassium carbonate.

The amount of the alkali metal compound to be supported on the metallic oxide varies depending on the kind, concentration, etc. of the alkoxide compound or the silane compound contained in the gas to be treated and thus can not be unequivocally determined. It is however, usually one (1) to 50, preferably 3 to 15 parts by weight expressed in terms of each alkali metal hydroxide based on 100 parts by weight of the metallic oxide. An amount thereof less than 1 part by weight results in lowered cleaning efficiency, whereas an amount more than 50 parts by weight leads to both difficulty in being sufficiently supported on the metallic oxide and expensiveness of its own.

It is desirable in the present invention that the cleaning agent in addition to the alkali metal compound be made to contain free water to some extent for the purpose of enhancing the efficiency of removing harmful components. The amount of free water to be contained is usually one (1) to 40%, preferably 5 to 30% by weight based on the total amount of the cleaning agent.

The cleaning agent can be prepared by, for example, dissolving an alkali metal compound in water, impregnating a metallic oxide with the resultant aqueous solution and then drying the impregnated metallic oxide at about 30° to 100° C. to attain a prescribed water content.

The concentration of a harmful gas to which the present invention is applicable is usually 1% or lower, preferably 0.1% or lower. The temperature of contact between the cleaning agent and the harmful gas is about 0° to 100° C., but it is usually room temperature (10° to 50° C.), thus dispensing with heating and cooling. In addition, temperature rise in the range of 10° to 40° C. due to reaction heat is sometimes observed after the start of contact in the case where the harmful gas has a high concentration or contains a highly reductive gas such as hydrogen. In no case, however, is there caused abnormal heat generation. The pressure at the time of contact between the cleaning agent and the harmful gas is usually atmospheric pressure, but the cleaning operation can be put into practice at a reduced pressure or under pressure such as 1 kg/cm$^2$G.

Air, nitrogen or hydrogen which contain a harmful gas and to which the process according to the present invention is applied may be either in a dry state or a wet state to the extent that moisture condensation is not caused. In most cases, the harmful gas is cleaned at a humidity corresponding to the relative humidity of the atmosphere ranging from 30 to 100%. In such a case, the free water content in the cleaning agent is preferably about 5 to 30% by weight.

In the cleaning process according to the present invention, there is no specific limitation to the concentration of the alkoxide-based component and silane-based component in the gas to be treated and the flow velocity of the gas. In general however, the flow velocity is desirably lowered with increasing concentration. The concentration at which the harmful components are easily removed by the contact with the cleaning agent is usually 1% or less by volume, but can be increased in the case of lower flow rate of the harmful gas.

The cleaning column is designed in accordance with the concentration of harmful gas, the amount of the gas to be treated, etc. The space linear velocity (LV) is preferably designed at 0.5 to 50 cm/sec for a relatively low concentration of harmful gas such as 0.1% or lower by volume, 0.05 to 20 cm/sec for a concentration of 0.1 to 1% by volume and 10 cm/sec or less for a high concentration such as 1% or higher by volume. Thus the general design criteria specify a LV value of 10 cm/sec or less in the case where a concentrated harmful gas is exhausted in a steady state from a semiconductor production process, and a LV value of 0.5 to 50 cm/sec in the case where a harmful gas is suddenly leaked from a gas cylinder and diluted with a large amount of air or the like.

The cleaning agent is usually packed in a cleaning column, which is generally in the form of a fixed bed and may be in the form of a mobile bed or a fluidized bed. The alkoxide-based compounds and silane-based compounds as harmful components contained in the gas are removed by passing the gas through the cleaning column to bring the gas into contact with the cleaning agent.

The bulk density of the cleaning agent is about 1.0 to 1.5 g/ml when it is packed in a cleaning column.

According to the process for cleaning harmful gas of the present invention it is made possible to effectively remove a alkoxide compound such as tetraethoxysilane and a silane compound that are contained in a gas irrespective of concentration ranging from low to high concentration. Furthermore even when a strongly reductive gas such as hydrogen is present, the harmful components can rapidly and safely be removed without causing abnormal heat generation. Thus the process of the present invention can an excellent effect when applied to the cleaning of exhaust gas from a semiconductor manufacturing process or an emergency harm-removal equipment for gas leaked from a gas cylinder.

In the following, the present invention will be described in more detail with reference to examples, which however shall not be construed to limit the present invention thereto.

EXAMPLE 1 TO 4

Preparation of Cleaning Agent

Potassium hydroxide in amounts of 5 to 250 g was dissolved in 400 to 800 ml of water in a vat, and each of the solutions was incorporated with 500 g of HOPKALITE (CuO: 40% by weight, $MnO_2$:60% by weight, produced by Nissan Girdler Co., Ltd.), followed by drying at 100° C. to prepare four 4 kinds of cleaning agents each having a different content of potassium hydroxide and different free water content as given in Table 1.

By the use of each of the cleaning agents thus prepared, a cleaning test was carried out for a harmful gas by a method wherein dry nitrogen containing 1711 ppm by volume of $Si(C_2H_5O)_4$ was allowed to flow through a cleaning column made of quartz glass with a 19 mm inside diameter and a 500 mm length which had been packed with 85 ml of the above-prepared cleaning agents, at 20° C. under atmospheric pressure at a flow rate of 510 ml/min (equivalent to space linear velocity (LV) of 3.0 cm/sec).

Then, the treated gas at the outlet of the cleaning column was sampled, and the sample gas was analyzed by means of a gas chromatograph (produced by Shimadzu Corporation, model GC-12A) to determine the period of time required for tetraethoxysilane contained in the treated gas to reach the upper limit of the permissible concentration (10 ppm) in terms of effective treatment time (min). The results are given in Table 1.

EXAMPLE 5 TO 7

The procedure in Example 1 was repeated to carry out a gas cleaning test except that the cleaning agent the same as that in Example 3 was employed and an alteration was made to the concentration of $Si(C_2H_5O)_4$ and the flow-through velocity (space linear velocity (LV)) of the gas. The results are also given in Table 1.

EXAMPLE 8 TO 9

The procedure in Example 1 was repeated to carry out a gas cleaning test except that the cleaning agent the same as that in Example 3 was employed; trimethylphosphorous acid in a content of 7894 ppm was used as the harmful component in place of 1711 ppm; an alteration was made to the flow-through velocity (LV); and a measurement was made of the period of time required for trimethylphosphorous acid contained in the treated gas to reach 10 ppm. The results are also given in Table 1.

EXAMPLE 10 TO 11

The procedure in Example 1 was repeated to carry out a gas cleaning test except that the cleaning agent the same as that in Example 3 was employed; monosilane and disilane each in a content of 10,000 ppm were used in Example 10 and 11, respectively, as harmful components in place of 1711 ppm tetraethoxysilane; an alteration was made to the flow-through velocity (LV); and a measurement was made of the period of the time required for monosilane or disilane contained in the treated gas to reach one (1) ppm. The results are collectively given in Table 1.

TABLE 1

| Example No. | Amount of Supported KOH (wt %) | Free water content (wt %) | Kind of harmful gas | Concentration of harmful gas (ppm) | Space linear velocity LV (cm/sec) | Effective treatment time (min) |
| --- | --- | --- | --- | --- | --- | --- |
| 1 | 5 | 7 | $Si(C_2H_5O)_4$ | 1711 | 3.0 | 780 |
| 2 | 10 | 8 | | 1711 | 3.0 | 1851 |
| 3 | 35 | 9 | | 1711 | 3.0 | 5065 |
| 4 | 50 | 9 | | 1711 | 3.0 | 5162 |
| 5 | 35 | 9 | | 1711 | 10.0 | 1432 |
| 6 | 35 | 9 | | 1711 | 0.5 | 32145 |
| 7 | 35 | 9 | | 6316 | 3.0 | 1240 |
| 8 | 35 | 9 | Trimethyl-phosphorous acid | 7894 | 10.0 | 374 |
| 9 | 35 | 9 | | 7894 | 3.0 | 1330 |
| 10 | 35 | 9 | Monosilane | 10000 | 3.0 | 500 |
| 11 | 35 | 9 | Disilane | 10000 | 3.0 | 380 |

What is claimed is:

1. A process for cleaning a harmful gas, which comprises contacting at a temperature of 10° to 50° C. a gas containing as a harmful component at least one alkoxide compound represented by the chemical formula $M(OR)_x$ wherein M is an element selected from the group consisting of silicon, arsenic, phosphorus, boron, tantalum and titanium, OR is an alkoxy group and x is the valency of the element, with a cleaning agent which comprises an alkali metal compound selected from the group consisting of a hydroxide, an oxide, and a carbonate, supported on a metallic oxide comprising cupric oxide and manganese dioxide, wherein the total amount of the cupric oxide and manganese dioxide is at least 60% by weight based on the total amount of the metallic oxide, and wherein said alkali metal compound is present in an amount of 10 to 50 parts by weight based on 100 parts by weight of said metallic oxide, to remove said harmful component from said harmful gas.

2. The process according to claim 1 wherein said alkali metal compound is at least one compound selected from the group consisting of a hydroxide, an oxide and a carbonate, each of an alkali metal selected from the group consisting of potassium, sodium and lithium.

3. The process according to claim 2 wherein said alkali metal compound is selected from the group consisting of potassium hydroxide, sodium hydroxide, potassium oxide and potassium carbonate.

4. The process according to claim 1 wherein said alkoxide compound as a harmful component is at least one compound selected from the group consisting of $Si(C_2H_5O)_4$, triethoxyarsenic, trimethylphosphorous acid, triethylphosphorous acid, trimethylphosphoric acid, triethylphosphoric acid and triethoxyboron.

5. The process according to claim 1 wherein the ratio by weight of the manganese dioxide to the cupric oxide is 1:0.8 to 5.

6. The process according to claim 1 wherein said cleaning agent contains 1 to 40% by weight of free water.

7. The process according to claim 1 wherein the total amount of the cupric oxide and manganese dioxide is at least 70% by weight based on the total amount of the metallic oxide, and the ratio by weight of the manganese dioxide to the cupric oxide is 1:1.2 to 3.

8. The process according to claim 7 wherein said cleaning agent contains 5 to 30% by weight of free water.

9. The process according to claim 8 wherein said alkali metal compound is selected from the group consisting of potassium hydroxide, sodium hydroxide, potassium oxide and potassium carbonate.

10. The process according to claim 9 wherein said alkoxide compound is at least one compound selected from the group consisting of $Si(C_2H_5O)_4$, triethoxyarsenic, trimethylphosphorous acid, triethylphosphorous acid, trimethylphosphoric acid, triethylphosphoric acid and triethoxyboron.

11. The process according to claim 10 wherein said harmful components are in a concentration of 0.1 to 1.0 volume %.

12. The process according to claim 11 wherein said cleaning agent is packed in a column and has a bulk density of 1.0 to 1.5 g/ml.

* * * * *